April 26, 1955     R. W. BURTON     2,707,032
VIBRATION DAMPENER FOR VEHICLE DRIVE SHAFT HOUSING
Filed Jan. 16, 1951
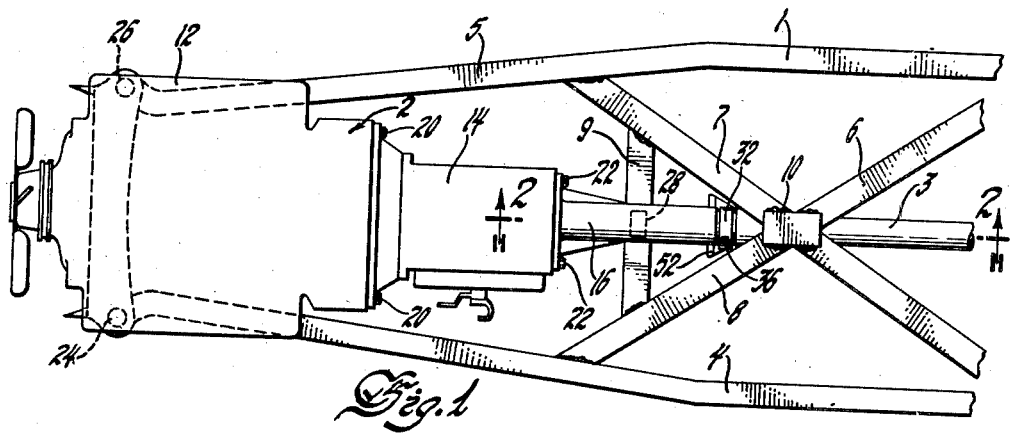
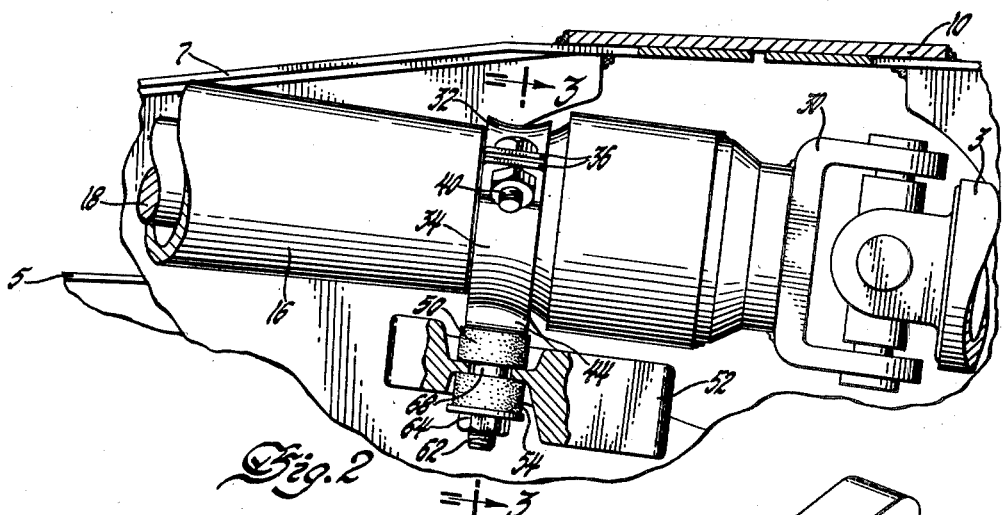
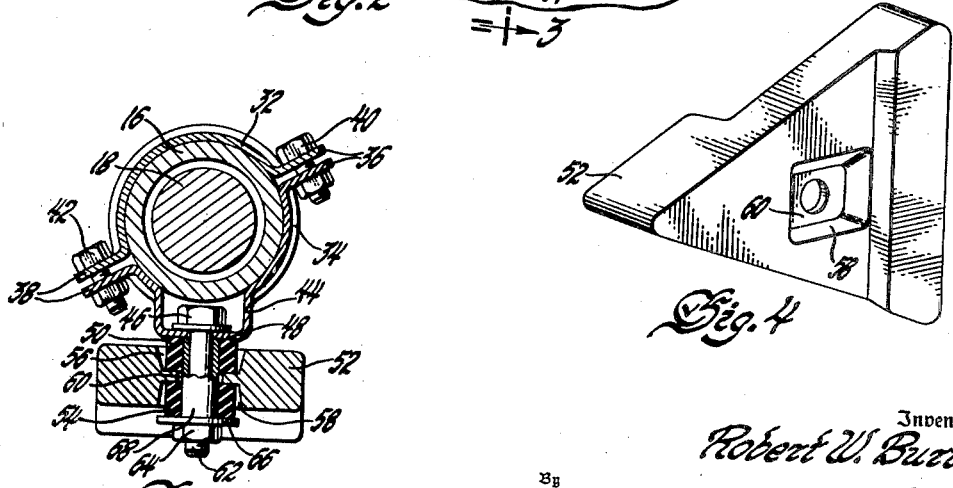
Inventor
Robert W. Burton
By Willits, Helmig & Baillio
Attorneys United States Patent Office 2,707,032
Patented Apr. 26, 1955

2,707,032

VIBRATION DAMPENER FOR VEHICLE DRIVE SHAFT HOUSING

Robert W. Burton, Detroit, Mich., assignor to General Motors Corporation, Detroit, Mich., a corporation Application January 16, 1951, Serial No. 206,244

5 Claims. (Cl. 180—64)

This invention relates to vibration dampers and particularly to means for damping vibration at the transmission end of an automotive vehicle power unit.

It is conventional practice in the art to assemble the engine and transmission housings rigidly together whereby they act as a unit and to support the engine end of this unit at two laterally opposite points on the vehicle frame and at a third point near the rear end of the transmission. Such a mounting permits the power unit to oscillate about a generally longitudinal axis with minimum unbalanced vibration couples while greatly facilitating the support of the unit at the desired height and inclination relative to the vehicle frame. In such vehicles, particularly those having a relatively long engine or a long transmission, an undesirable vibration (apparently a function of beam-wise flexure of the power unit) has been found to occur at the rear end of the transmission producing an objectionable "rumble" during vehicle operation. This condition is further agravated in the case of those vehicles having the front universal joint substantially rearward of transmission, and the transmission driven shaft radially supported adjacent this joint by an extension housing rigidly secured to the transmission housing.

It accordingly is the object of this invention to provide simple and effective means for damping vibration of the rear end of such power units whereby the forementioned advantages of the three-point mounting are maintained without the objectionable "rumble" in operation.

I have chosen for purposes of illustration an automotive vehicle power unit of the type shown in the accompanying drawing which will now be described.

Figure 1 is a plan view of an automotive vehicle chassis with my invention applied to the rear end of the transmission extension housing.

Figure 2 is an enlarged view partly in section and partly in elevation taken substantially on line 2—2 of Figure 1.

Figure 3 is a sectional view taken substantially on line 3—3 of Figure 2.

Figure 4 is a further enlarged view in persepective of the weight which forms part of my invention.

The chassis of the automotive vehicle shown in the drawing includes the frame 1 on which is mounted a power unit designated generally by the numeral 2 and shown drivably connected to the vehicle drive shaft 3. Included in the frame 1 are longitudinal side sills 4 and 5 and an X-member designated generally at 6, the two forwardly extending legs 7 and 8 of which are tied together by a cross member 9. The center of the X-member is reinforced by a cap plate 10 and the various parts of the frame 1 are secured together in any desired manner as by welding, bolting etc.

The power unit 2 includes a conventional internal combustion engine having a housing 12, to the rear end of which is rigidly secured the transmission housing 14 having, in turn, a rigidly secured rearwardly extending housing 16 through which extends the transmission driven shaft 18. Bolts 20 and 22 are shown as the means for rigidly securing the engine, transmission and shaft extension housings together, although, of course, other means may be provided. A composite rigid housing structure for the power unit is thus obtained, and in accordance with conventional practice this structure is provided with a three-point mounting on the chassis frame 1. The two formed points of this mounting are indicated at 24 and 26 in Figure 1 at which the engine housing 12 is anchored to the side sills 4 and 5 respectively, and a third mounting point is indicated at 28 where the extension housing 16 is anchored to the cross member 9. Drivably interconnecting the rear end of the transmission extension shaft 18 and the forward end of the vehicle drive shaft 3 is a universal joint 30.

Apparently due to a rotary couple, set up in the universal joint 30 upon the application of torque and/or rotating out of balance forces of shaft 3, a certain amount of resonant vibration (principally vertical) occurs at the rear of the extension housing 16 resulting in vibration being transmitted through the engine supports 24, 26, 28 to the frame 1, and to eliminate or at least effectively damp this vibration I have provided a device to be now described.

Embracing the extension housing 16 and tightly clamped thereabout are a pair of generally semi-cylindrical brackets 32 and 34, each provided on diametrically opposite sides with ears 36 and 38 through which pass bolts 40 and 42 holding the brackets in place. The lower bracket 34 is formed with a depending embossment 44 apertured for passage of a further depending member shown as a bolt 46. The bottom face 48 of the embossment 44 forms a clamping surface for the upper end of a cushion member 50. Suspended from the bolt 46 and clamped against the bottom face of the cushion member 50 is a weight 52. A second cushion member 54 is clamped between the lower end of the bolt 46 and the weight 52. The cushion members 50 and 54 may be made of any yieldable resilient material such as soft rubber, and to conserve space, they are seated in recesses or pockets 56 and 58 formed in the top and bottom surfaces of the weight 52. A web section 60 separates the two pockets and has a central aperture providing a substantial clearance about the shank 62 of the bolt 46. The weight 52, cushion members 50 and 54 and clamp member 34 are all held in assembled relation by a nut 64 threaded to the lower end of the bolt shank 62 and separated from the cushion member 54 by a washer 66. For the purpose of insuring against the cushion members being overly compressed during assembly of the damper, a spacer sleeve 68 (Figure 3) may be provided about the bolt shank between the embossment face 48 and the washer 66. In assembly, the nut 64 may thus be drawn up tightly on the bolt shank and the predetermined length of the spacer sleeve 68 will insure obtaining the desired compression of the cushion members. As best shown in Figure 4, the weight 52 is triangularly shaped. This shape enables the weight to be spacedly nested between the forwardly extending legs 7 and 8 of the X-member where it will have the necessary lateral freedom of movement and be as close as possible to the rear end of the extension housing 16.

In operation, vibration of the extension housing 16 in a vertical direction relative to the forward end of the power unit or to the frame 1 causes the weight to undergo a sympathetic vibration, out of phase with that of the extension housing; and by preselecting the compression of the cushion members 50 and 54 the frequency of the weight vibration may be tuned to that of the housing vibration with the result that the housing vibration is effectively damped.

While I have described and illustrated a preferred form of my invention as applied to the power unit of an automotive vehicle, it will be understood, of course, that the same may take other forms coming within the spirit and scope of the appended claims.

I claim:

1. In an automotive vehicle having a frame including longitudinal side sills interconnnected by an X-member with the adjacent legs at one end the X-member interconnected by a cross member, a power unit including an engine, transmission and transmission driven shaft extension in end-to-end driving relation, a single composite housing for said power unit supported on opposite sides of the engine by said sills and intermediate the ends of said shaft extension by said cross member, a vehicle drive shaft having a universal connection with said shaft extension, and means for damping vibration of said housing adjacent said universal connection during application of torque to said drive shaft, said means including a triangular shaped weight in spaced nesting relation between the legs of said X-member opposite said cross member, said weight having aligned upwardly and downwardly presenting pockets formed in its top and bottom faces and an interconnecting aperture, resilient cushions seated in said pockets and having apertures aligned with said interconnecting aperture, a member extending through said apertures and holding said cushions compressed against the bottoms of said pockets, and a bracket clamped about said housing and secured to the upper end of said member.

2. In a vehicle power transmitting mechanism including in combination an engine, a propeller shaft operatively connected to said engine and subject to unbalanced radial forces, said shaft having a longitudinal axis, an elongated housing for said propeller shaft, said housing being supported at one end by said engine, the other end of said housing being unsupported to provide an elongated cantilevered end portion, said shaft being capable of transmitting radial forces to said unsupported end of said housing to thereby subject a part of said housing to radial vibrations, a supporting member attached to the part of said housing subjected to said vibration, a weight, and a resilient connection between said weight and said supporting member, said connection having a longitudinal axis and permitting said weight to oscillate about the axis of said resilient connection under forces transmitted through said supporting member at a fundamental frequency near the frequency of said housing vibrations whereby energy is exchanged between said housing and said weight to thereby substantially eliminate the vibration of said housing.

3. In a power transmitting mechanism including in combination an engine, a rotating power shaft subject to unbalanced radial forces, said shaft having a longitudinal axis, an elongated housing for said rotating shaft, said housing being supported at one end by said engine, the other end of said housing being unsupported to provide an elongated cantilevered end portion, said shaft being capable of transmitting radial forces to said unsupported end of said housing to thereby subject part of said housing to radial vibrations, and means for damping vibration of said housing, said means including a substantially flat weight, said weight being spaced radially from said housing and having oppositely-disposed faces with an interconnecting aperture perpendicular to said shaft axis, resilient cushions having apertures aligned with said interconnecting aperture, a pivot member extending through said apertures and holding said cushions compressed against said oppositely-disposed faces, and a bracket clamped about said housing adjacent to said unsupported end and secured to said member.

4. In a power transmitting mechanism including in combination an engine, a rotating power shaft operatively connected to said engine, said shaft having a longitudinal axis, an elongated housing for said shaft, said housing being supported at one end by said engine, the other end of said housing being unsupported to provide an elongated cantilevered end portion, said shaft being journalled in the unsupported end of said housing thereby subjecting a part of said housing to radial vibrations, and means for damping the vibrations of said housing, said means including a supporting member attached to the part of said housing subjected to said vibrations, a substantially flat weight spaced radially from said housing and a resilient connection between said weight and said supporting member, said resilient connection having a longitudinal axis substantially perpendicular to said shaft axis and said connection tending to maintain the substantially flat weight in perpendicular relation to the axis of the resilient connection.

5. In a power transmitting mechanism including in combination an engine, a rotating power shaft operatively connected to said engine, an elongated housing for said shaft, said housing being supported at one end by said engine, the other end of said housing being unsupported, said shaft rotatively engaging the unsupported end of said housing thereby subjecting a part of said housing to radial vibrations, and means for dampening the vibrations of said housing, said means including a supporting member attached to the part of said housing subjected to said vibrations, a substantially flat weight spaced radially from said housing, and a resilient connection between said weight and said supporting member, said resilient connection having a longitudinal axis substantially perpendicular to said shaft axis and said connection tending to maintain the substantially flat weight in perpendicular relation to the axis of the resilient connection, said weight having a plane of symmetry passing through the axis of said resilient connection and the longitudinal axis of said shaft and being asymmetrical about a second plane containing the axis of said connection and normal to said plane of symmetry.

References Cited in the file of this patent

UNITED STATES PATENTS

| | | |
|---|---|---|
| 1,638,782 | Paton | Aug. 9, 1927 |
| 1,819,665 | Wiltse | Aug. 18, 1931 |
| 1,855,570 | Edison | Apr. 26, 1932 |
| 1,917,894 | MacPherson | July 11, 1933 |
| 2,022,102 | Anibal | Nov. 26, 1935 |
| 2,271,935 | Buchanan et al. | Feb. 3, 1942 |
| 2,328,518 | Wahlberg et al. | Aug. 31, 1943 |